US012586727B2

(12) United States Patent
Lee et al.

(10) Patent No.: US 12,586,727 B2
(45) Date of Patent: Mar. 24, 2026

(54) MULTILAYERED CAPACITOR AND METHOD FOR MANUFACTURING THE SAME

(71) Applicant: SAMSUNG ELECTRO-MECHANICS CO., LTD., Suwon-si (KR)

(72) Inventors: Chaedong Lee, Suwon-si (KR); Seung Ah Kim, Suwon-si (KR); Gyuho Yeon, Suwon-si (KR); Chulseung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 55 days.

(21) Appl. No.: 18/388,693

(22) Filed: Nov. 10, 2023

(65) Prior Publication Data

US 2024/0203662 A1 Jun. 20, 2024

(30) Foreign Application Priority Data

Dec. 16, 2022 (KR) ........................ 10-2022-0177118
Mar. 6, 2023 (KR) ........................ 10-2023-0029326

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/232* | (2006.01) |

(52) U.S. Cl.
CPC .............. *H01G 4/30* (2013.01); *H01G 4/008* (2013.01); *H01G 4/012* (2013.01); *H01G 4/12* (2013.01); *H01G 4/2325* (2013.01)

(58) Field of Classification Search
CPC .......... H01G 4/30; H01G 4/008; H01G 4/012; H01G 4/12; H01G 4/2325
See application file for complete search history.

(56) References Cited

U.S. PATENT DOCUMENTS

| | | | | |
|---|---|---|---|---|
| 2010/0128412 A1* | 5/2010 | Nishihara | ................ | H01G 4/30 |
| | | | | 361/306.3 |
| 2015/0083475 A1* | 3/2015 | Kim | ........................ | H01G 2/06 |
| | | | | 29/25.42 |

(Continued)

FOREIGN PATENT DOCUMENTS

| | | |
|---|---|---|
| JP | 2000-182883 A | 6/2000 |
| JP | 2003-318059 A | 11/2003 |

(Continued)

OTHER PUBLICATIONS

The Extended European Search Report dated Jul. 26, 2024 issued in European Patent Application No. 23208687.6.

*Primary Examiner* — Michael P Mcfadden
(74) *Attorney, Agent, or Firm* — Morgan, Lewis & Bockius LLP

(57) ABSTRACT

A multilayered capacitor including a capacitor body including a dielectric layer and an internal electrode, and an external electrode outside the capacitor body, wherein the external electrode includes a conductive resin layer disposed outside the capacitor body and including a resin and a conductive metal, and a metal layer disposed on a surface of the conductive resin layer and including a noble metal.

31 Claims, 10 Drawing Sheets

(56)  References Cited

U.S. PATENT DOCUMENTS

| | | | | |
|---|---|---|---|---|
| 2015/0287532 | A1* | 10/2015 | Abe | H05K 3/3436 |
| | | | | 427/79 |
| 2017/0103853 | A1* | 4/2017 | Zenzai | H01G 4/232 |
| 2017/0301464 | A1* | 10/2017 | Terashita | H01G 4/12 |
| 2019/0013150 | A1 | 1/2019 | Koo et al. | |
| 2020/0090871 | A1* | 3/2020 | Ahn | H01G 4/30 |
| 2020/0118761 | A1* | 4/2020 | Terashita | H01G 4/1209 |
| 2021/0050152 | A1* | 2/2021 | Zenzai | H05K 1/092 |
| 2021/0082622 | A1 | 3/2021 | Kim et al. | |
| 2023/0377800 | A1* | 11/2023 | Hoshino | H01G 4/2325 |

FOREIGN PATENT DOCUMENTS

| | | | |
|---|---|---|---|
| KR | 10-2019-0008406 | A | 1/2019 |
| KR | 10-2292798 | B1 | 8/2021 |

* cited by examiner

FIG. 4

III

FIG. 6

MULTILAYERED CAPACITOR AND METHOD FOR MANUFACTURING THE SAME

CROSS-REFERENCE TO RELATED APPLICATION

This application claims priority to and the benefit of Korean Patent Application No. 10-2022-0177118 filed in the Korean Intellectual Property Office on Dec. 16, 2022, and Korean Patent Application No. 10-2023-0029326 filed in the Korean Intellectual Property Office on Mar. 6, 2023, the entire contents of which are incorporated herein by reference.

BACKGROUND

(a) Technical Field

This disclosure relates to a multilayered capacitor and a method for manufacturing the same.

(b) Description of the Related Art

In an external electrode of the multilayered capacitor, a conductive resin layer including a polymer resin is introduced to absorb various external impacts applied to the multilayered capacitor and relieve stress.

When the conductive resin layer of the external electrode includes silver (Ag), there is a problem of forming silver (Ag) dendrite on the multilayered capacitor surface due to ion migration. For example, when a temperature drops under high humidity, since moisture is condensed on the multilayered capacitor surface and serves as an electrolyte between both of electrodes of the multilayered capacitor to which a voltage is applied, silver (Ag) ions included in the external electrode is migrated. In order to solve this problem, methods of water-repellent coating on the surface and the like are being explored.

On the other hand, when the conductive resin layer of the external electrode includes copper (Cu), compared with when the conductive resin layer includes silver (Ag), there are advantages of excellent ion migration prevention effect and low price.

However, continuous improvement is required in terms of increasing the equivalent series resistance (ESR) by surface oxidation of copper, decelerating thermal decomposition of a resin, and suppressing breaks of a plating layer on the surface of a resin electrode, and the like.

SUMMARY

In one aspect of the present disclosure, an initial ESR of a multilayered capacitor may be lowered and deterioration due to temperature change may be reduced by lowering a surface resistance of a conductive resin layer in the external electrode. In addition, it is possible to provide a multilayered capacitor capable of uniformly and quickly forming a plating layer of an external electrode and preventing or delaying an occurrence of ion migration by minimizing an amount of noble metal used in the external electrode.

A multilayered capacitor according to one aspect includes a capacitor body including a dielectric layer and an internal electrode, and an external electrode outside the capacitor body and on the capacitor body, wherein the external electrode includes: a conductive resin layer disposed outside the capacitor body and on the capacitor body, the conductive resin layer including a resin and a conductive metal, and a metal layer disposed on a surface of the conductive resin layer and including a noble metal.

The noble metal may include silver (Ag), platinum (Pt), gold (Au), or a combination thereof.

The capacitor body may have first and second surfaces facing each other in a stacking direction of the dielectric layer and the internal electrode, third and fourth surfaces facing each other in a longitudinal direction, and fifth and sixth surfaces facing each other in a width direction.

In a cross-section of the multilayered capacitor in the longitudinal and thickness directions perpendicular to the width direction at a center point in the width direction, a weight ratio of the noble metal to the conductive metal in a unit area of 25 μm×4 μm may be about 0.05:1 to about 0.4:1.

In a cross-section of the multilayered capacitor in the longitudinal and thickness directions perpendicular to the width direction at the center point in the width direction, an average length of the metal layer in the longitudinal direction on the third or fourth surface may be less than or equal to about 5 μm.

In a cross-section of the multilayered capacitor in the longitudinal and thickness directions perpendicular to the width direction at the center point in the width direction, an average length of the metal layer in the longitudinal direction on the third or fourth surface may be about 0.7 μm to about 4.5 μm.

In a cross-section of the multilayered capacitor in the longitudinal and thickness directions perpendicular to the width direction at the center point in the width direction, an average length of the metal layer in the thickness direction on the first or second surface may be less than or equal to about 5 μm.

In a cross-section of the multilayered capacitor in the longitudinal and thickness directions perpendicular to the width direction at the center point in the width direction, an average length of the metal layer in the thickness direction on the first or second surface may be about 0.7 μm to about 4.5 μm.

The metal layer may include aggregated noble metal nanoparticles.

An average particle size of the noble metal nanoparticles may be about 0.2 μm to about 2.5 μm.

In a cross-section of the multilayered capacitor in the longitudinal and thickness directions perpendicular to the width direction at the center point in the width direction, the metal layer may include a break portion, an island portion, a pore portion, or a combination thereof.

At least a portion of the noble metal nanoparticles at an interface with the conductive resin layer may penetrate into the conductive resin layer.

The resin may include an epoxy-based resin, and the conductive metal may include copper (Cu), silver (Ag), nickel (Ni), or a mixture thereof.

The external electrode may further include a plating layer outside the conductive resin layer and on the conductive resin layer.

The plating layer may include nickel (Ni), copper (Cu), tin (Sn), palladium (Pd), platinum (Pt), gold (Au), silver (Ag), tungsten (W), titanium (Ti), lead (Pb), an alloy thereof, or a mixture thereof.

The external electrode may further include a sintered metal layer between the capacitor body and the conductive resin layer.

The sintered metal layer may include a conductive metal and glass.

The external electrode may have a connection portion configured to cover the third or fourth surface of the capacitor body and a band portion configured to cover a corner of the third or fourth surface.

The metal layer may be disposed in the connecting portion, the band portion, or both.

The metal layer may be disposed only at the connection portion.

The metal layer may be disposed on the connection portion and the band portion.

An average thickness of the metal layer in the band portion may be greater than an average thickness of the metal layer in the connection portion.

A method of manufacturing a multilayered capacitor according to another aspect includes manufacturing a capacitor body including a dielectric layer and an internal electrode, and forming an external electrode outside the capacitor body and on the capacitor body, wherein the forming of the external electrode includes forming a conductive resin layer including a resin and a conductive metal outside the capacitor body and on the capacitor body, and forming a metal layer including a noble metal outside the conductive resin layer and on the conductive resin layer.

The forming of the metal layer may include performing a galvanic exchange method, an electrolytic plating method, a curable resin paste coating method, a sintering-type ink coating method, an electroless plating method including a reducing agent, a metal organic decomposition (MOD) ink coating method, or a vapor deposition method.

The forming of the conductive resin layer may include coating a paste for the conductive resin layer including the resin, a conductive metal powder, and an organic solvent.

The forming of the external electrode may further include, before the forming of the conductive resin layer, coating a paste for a sintered metal layer including the conductive metal and glass outside the capacitor body and on the capacitor body, and then sintering the paste to form a sintered metal layer.

The forming of the external electrode may further include, after the forming of the metal layer, forming a plating layer on the metal layer by performing a plating method.

A multilayered capacitor according to one aspect includes a capacitor body including a dielectric layer and an internal electrode, and an external electrode outside the capacitor body and on the capacitor body, wherein the external electrode includes: a conductive resin layer disposed outside the capacitor body and on the capacitor body, the conductive resin layer including a resin and a conductive metal, and a metal layer disposed on a surface of the conductive resin layer and on the capacitor body, the conductive resin layer including a noble metal, wherein the metal layer may be free of resin.

A method of manufacturing a multilayered capacitor according to another aspect includes manufacturing a capacitor body including a dielectric layer and an internal electrode, and forming an external electrode outside the capacitor body and on the capacitor body, wherein the forming of the external electrode includes forming a conductive resin layer including a resin and a conductive metal outside the capacitor body and on the capacitor body, and forming a metal layer including a noble metal outside the conductive resin layer and on the conductive resin layer by performing a galvanic exchange method, an electrolytic plating method, a sintering-type ink coating method, an electroless plating method including a reducing agent, a metal organic decomposition (MOD) ink coating method, or a vapor deposition method.

According to the multilayered capacitor according to one aspect, an initial ESR of a multilayered capacitor may be lowered and deterioration due to temperature change may be reduced by lowering a surface resistance of a conductive resin layer in the external electrode. In addition, the plating layer of the external electrode may be uniformly and quickly formed, and an occurrence of ion migration may be prevented or delayed by minimizing an amount of noble metal used in the external electrode.

BRIEF DESCRIPTION OF THE DRAWINGS

FIG. 4 is an enlarged cross-sectional view of region III in FIG. 2.

FIG. 6 is a photograph of a boundary between an external electrode and a capacitor body of the multilayered capacitor manufactured in Example 1 analyzed by energy dispersive spectroscopy (EDS).

DETAILED DESCRIPTION OF THE EMBODIMENTS

Figure 1:
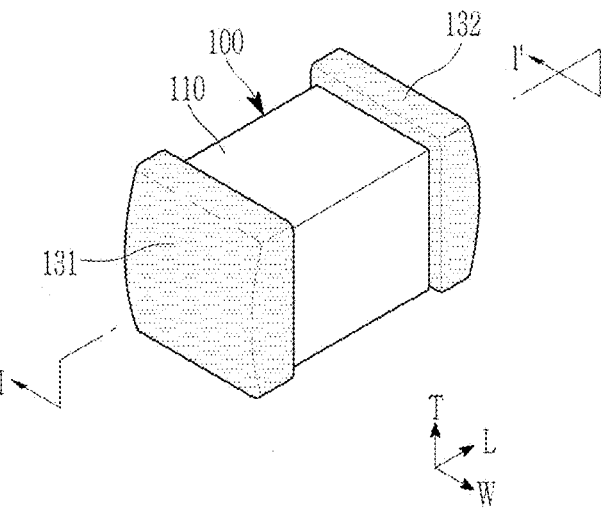
FIG. 1 is a perspective view illustrating a multilayered capacitor according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
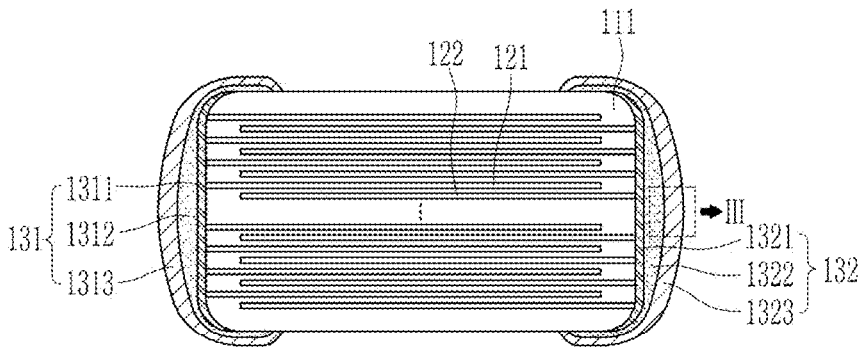
FIG. 2 is a cross-sectional view of the multilayered capacitor taken along line I-I' in FIG. 1.
Figure 3:
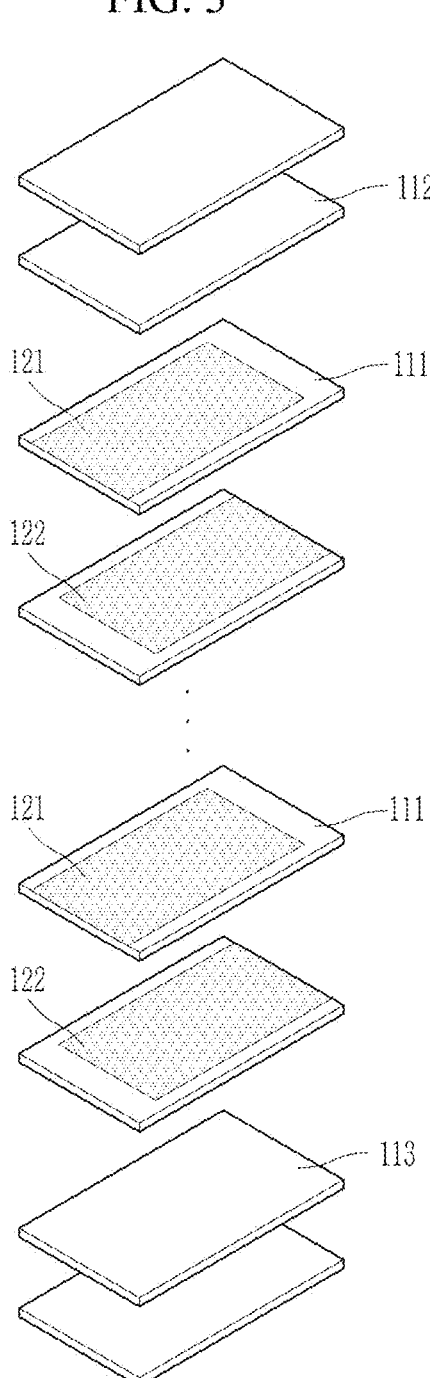
FIG. 3 is an exploded perspective view illustrating a stacked structure of internal electrodes in the capacitor body in FIG. 1
Figure 3:
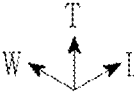

FIG. 1 is a perspective view illustrating a multilayered capacitor 100 according to an embodiment, FIG. 2 is a cross-sectional view of the multilayered capacitor 100 taken along line I-I' of FIG. 1, and FIG. 3 is an exploded perspective view illustrating a stacked structure of internal electrodes in the capacitor body 110 of FIG. 1.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 3, the multilayered capacitor 100 according to the present embodiment may include the capacitor body 110, and first and second external electrodes 131 and 132 disposed at both ends of the capacitor body 110 which face each other in the longitudinal direction (L-axis direction).

The capacitor body 110 may have, for example, a substantially hexahedral shape.

In this embodiment, for convenience of explanation, in the capacitor body 110, surfaces opposite to each other in the thickness direction (T-axis direction) are defined as first and second surfaces, surfaces connected to the first and second surfaces and facing each other in the longitudinal direction (L-axis direction) are defined as third and fourth surfaces, and surfaces connected to the first and second surfaces, connected to the third and fourth surfaces, and facing each other in the width direction (W-axis direction) are defined as fifth and sixth surfaces. For example, the first surface, which is a lower surface, may be a surface facing a mounting direction. In addition, the first to sixth surfaces may be flat, but are not limited thereto, and for example, the first to sixth surfaces may be curved surfaces with a convex central portion, and a corner of each surface which is a boundary, may be round.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and a plurality of first and second internal electrodes 121 and 122 which are alternately disposed in a thickness direction (T-axis direction) with the dielectric layers 111 interposed therebetween. In this case, the first and second internal electrodes 121 and 122 may have different polarities.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayered capacitor 100. For example, the active region may be a region in which the first and second internal electrodes 121 and 122 are stacked and overlapped with each other along the thickness direction (T-axis direction).

The cover regions 112 and 113 may be respectively disposed on the first and the second surfaces of the active region in the thickness direction (T-axis direction) as margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces of the active region in the width direction (W-axis direction). Such a side cover region may be formed by coating a conductive paste layer for forming an internal electrode only on a portion of the surface of the dielectric green sheet, stacking dielectric green sheets on which a conductive paste layer is not coated on both side surfaces of the dielectric green sheet, and firing the same.

The cover regions 112 and 113 and the side cover regions serve to prevent damage to the first and second internal electrodes 121 and 122 due to physical or chemical stress.

For example, the dielectric layer 111 may include a ceramic material having a high dielectric constant. For example, the ceramic material may include a dielectric ceramic including components such as $BaTiO_3$, $CaTiO_3$, $SrTiO_3$, or $CaZrO_3$, and the like. In addition, auxiliary components such as a Mn compound, a Fe compound, a Cr compound, a Co compound, and a Ni compound may be further included in addition to these components. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, etc. are partially dissolved in $BaTiO_3$-based dielectric ceramics.

In addition, a ceramic powder, a ceramic additive, an organic solvent, a plasticizer, a binder, a dispersant, and the like may be further added to the dielectric layer 111. The ceramic additive may include, for example, transition metal oxide or transition metal carbide, a rare earth element, magnesium (Mg), or aluminum (Al), and the like.

For example, an average thickness of the dielectric layer 111 may be about 0.5 μm to about 10 μm.

The first and second internal electrodes 121 and 122 are electrodes having different polarities, and are alternately disposed to face each other along the thickness direction (T-axis direction) with the dielectric layer 111 interposed therebetween, and one end thereof may be exposed through the third and fourth surfaces of the capacitor body 110.

The first and second internal electrodes 121 and 122 may be electrically insulated from each other by the dielectric layer 111 disposed therebetween.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrodes 121 and 122 may include a conductive metal, for example, a metal such as Ni, Cu, Ag, Pd, or Au, an alloy thereof, for example an Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste including a conductive metal. As a method of printing the conductive paste, a screen-printing method or a gravure printing method or the like may be used.

For example, each average thickness of the first and second internal electrodes 121 and 122 may be about 0.1 μm to about 2 μm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first and second external electrodes 131 and 132 may respectively include first and second connection portions disposed on the third and fourth surfaces of the capacitor body 110 and connected to the first and second internal electrodes 121 and 122, and may also include first and second band portions disposed at each corner where the third and fourth surfaces and the first and second surfaces or the fifth and sixth surfaces of the capacitor body 110 and the third and fourth surfaces thereof meet.

The first and second band portions may extend from the first and second connection portions to portions of the first and second surfaces or the fifth and sixth surfaces of the capacitor body 110. The first and second band portions may serve to improve adhesion strength of the first and second external electrodes 131 and 132.

Figure 4:
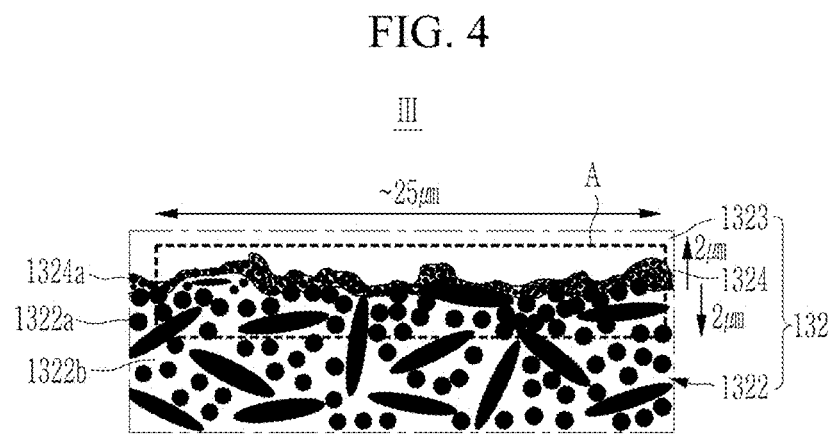

FIG. 4 is an enlarged cross-sectional view of the region III of FIG. 2 to schematically show a bonding boundary region between the second external electrode 132 and the capacitor body 110. FIG. 4 shows the second external electrode 132 alone, but the first external electrode 131 also has similar characteristics to those of the second external electrode 132 shown in FIG. 4. Hereinafter, referring to FIG. 4, the first and second external electrodes 131 and 132 of the present example embodiment are illustrated in detail.

For example, the first and second external electrodes 131 and 132 may include sintered metal layers 1311 and 1321 in contact with the capacitor body 110, conductive resin layers 1312 and 1322 disposed to cover the sintered metal layers 1311 and 1321, and plating layers 1313 and 1323 disposed to cover the conductive resin layers 1312 and 1322, respectively.

The sintered metal layers 1311 and 1321 may include a conductive metal and glass.

For example, the sintered metal layers 1311 and 1321 may include a conductive metal such as copper (Cu), nickel (Ni), silver (Ag), palladium (Pd), gold (Au), platinum (Pt), tin (Sn), and tungsten. (W), titanium (Ti), lead (Pb), an alloy thereof, or a combination thereof, and for example the copper (Cu) may include a copper (Cu) alloy. When the conductive metal includes copper, the metal other than copper may be included in an amount of about 5 parts by mole or less based on 100 parts by mole of copper.

For example, the sintered metal layers 1311 and 1321 may include a composition in which oxides are mixed with glass, and may be for example, at least one selected from silicon oxide, boron oxide, aluminum oxide, transition metal oxide, alkali metal oxide, and alkaline earth metal oxide. The transition metal may be selected from zinc (Zn), titanium (Ti), copper (Cu), vanadium (V), manganese (Mn), iron (Fe), and nickel (Ni); the alkali metal may be selected from lithium (Li), sodium (Na), and potassium (K); and the alkaline-earth metal may be selected from magnesium (Mg), calcium (Ca), strontium (Sr), and barium (Ba).

The contents of conductive metal and glass in the sintered metal layers 1311 and 1321 is not particularly limited, but for example, in a cross-section cut in the longitudinal direction (L-axis direction) and thickness direction (T-axis direction) perpendicular to the width direction (W-axis direction) at the center (½) point in the width direction (W-axis direction) of the multilayered capacitor 100, an average area of the conductive metal may be about 30% to about 90%, or about 70% to about 90% relative to a total area of the sintered metal layers 1311 and 1321.

The conductive resin layers 1312 and 1322 are formed on the sintered metal layers 1311 and 1321 and for example, it may be formed to completely cover the sintered metal layers 1311 and 1321. Meanwhile, the first and second external electrodes 131 and 132 may not include the sintered metal layers 1311 and 1321, in which case the conductive resin layers 1312 and 1322 may directly contact the capacitor body 110.

The conductive resin layers 1312 and 1322 may extend to the first and second surfaces or the fifth and sixth surfaces of the capacitor body 110, and a length of the region (i.e., the band portion) where the conductive resin layers 1312 and 1322 extend to the first and second surfaces or the fifth and sixth surfaces of the capacitor body 110 may be longer than a length of the region (i.e., the band portion) where the sintered metal layers 1311 and 1321 extend to the first and second surfaces or the fifth and sixth surfaces of the capacitor body 110. That is, the conductive resin layers 1312 and 1322 may be formed on the sintered metal layers 1311 and 1321 and completely cover the sintered metal layers 1311 and 1321.

The conductive resin layers 1312 and 1322 include a resin 1322b and a conductive metal 1322a.

The resin 1322b included in the conductive resin layers 1312 and 1322 is not particularly limited as long as it has bondability and impact absorption, and may be mixed with the powder of the conductive metal 1322a to form a paste. For example, it may include a phenol resin, an acrylic resin, a silicone resin, an epoxy resin, or a polyimide resin.

The conductive metal 1322a included in the conductive resin layers 1312 and 1322 serves to be electrically connected to the first and second internal electrodes 121 and 122 or the sintered metal layers 1311 and 1321.

The conductive metal 1322a included in the conductive resin layers 1312 and 1322 may have a spherical shape, a flake shape, or a combination thereof. That is, the conductive metal 1322a may be formed only in a flake shape, only in a spherical shape, or may have a mixed shape of a flake shape and a spherical shape.

Here, the spherical shape may also include a shape that is not perfectly spherical, and may include a shape in which, for example, a length ratio between a major axis and a minor axis (long axis/short axis) may be less than or equal to about 1.45. The flake-type powder means a powder having a flat and elongated shape, and is not particularly limited, but may have, for example, a length ratio between a major axis and a minor axis (long axis/short axis) of greater than or equal to about 1.95.

The conductive resin layers 1312 and 1322 may include copper (Cu), silver (Ag), nickel (Ni), or a mixture thereof as the conductive metal 1322a. When the conductive resin layers 1312 and 1322 include silver (Ag), since silver (Ag) dendrites may be formed on the surface of the multilayered capacitor 100 by ion migration and thus, by using copper (Cu), an amount of noble metal used in the first and second external electrodes 131 and 132 may be minimized, thereby preventing or delaying an occurrence of ion migration.

For example, an average length, that is, an average thickness of the conductive resin layers 1312 and 1322 in the longitudinal direction (L-axis direction) of the first and second connection portions may be less than about 13 μm or less than about 7.4 μm. When the average length of the conductive resin layers 1312 and 1322 in the longitudinal direction (L-axis direction) of the first and second connection portions is about 13 μm or more, ESR may increase and electrical characteristics may deteriorate.

Meanwhile, an average length, that is, an average thickness, in the thickness direction (W-axis direction) of the conductive resin layers 1312 and 1322 in the first and second band portions does not need to be particularly limited. However, in order to secure sufficient bending strength characteristics, the average length in the thickness direction (W-axis direction) of the conductive resin layers 1312 and 1322 in the first and second band portions may be greater than about 9.43 μm or greater than about 15.21 μm.

The conductive resin layers 1312 and 1322 in the first and second band portions may be disposed to cover a least a portion of the sintered metal layers 1311 and 1321. In other words, referring to FIG. 2, the longitudinal direction (L-axis direction) length of the first and second band portions of the conductive resin layers 1312 and 1322 may be longer than that of the first and second band portions of the sintered metal layers 1311 and 1321. Accordingly, bending strength characteristics may be further improved, and in addition, moisture resistance reliability may be improved by covering the ends of the first and second band portions of the sintered metal layers 1311 and 1321 to block a moisture permeation path.

On the other hand, when the conductive resin layers 1312 and 1322 of the first and second external electrodes 131 and 132 include copper (Cu), compared with when conductive resin layers 1312 and 1322 include silver (Ag), there are advantages of excellent ion migration prevention effect and low price.

However, when the conductive resin layers 1312 and 1322 of the first and second external electrodes 131 and 132 include copper (Cu), after coating the paste for forming the conductive resin layers 1312 and 1322, the metal exposed onto the surface is oxidized, while exposed to air at a high temperature during the drying and curing, thereby increasing sheet resistance. As a result, ESR of the multilayered capacitor 100 may be increased, thermal decomposition of the resin 1322b included in the conductive resin layers 1312 and 1322 may be promoted, thereby resulting in uneven or broken plating of the plating layers 1313 and 1323.

In order to solve this problem, the multilayered capacitor 100 according to the present example embodiment is disposed on the surface of the conductive resin layers 1312 and 1322 and includes a metal layer 1324 including a noble metal.

The noble metal included in the metal layer 1324 may be the conductive metal 1322a included in the conductive resin layers 1312 and 1322, for example, a metal more easily oxidized than the copper (Cu), such as silver (Ag), platinum (Pt), gold (Au), or a combination thereof.

The metal layer 1324 may reduce sheet resistance of the conductive metal 1322a included in the conductive resin layers 1312 and 1322, so that the plating of the plating layers 1313 and 1323 may be rapidly and uniformly performed, improving plating defects. In addition, when the conductive metal 1322a of the conductive resin layers 1312 and 1322 includes silver (Ag), an amount of the silver (Ag) may be minimized, preventing or delaying the ion migration.

The metal layer 1324 may be disposed in the first and second connection portions and the first and second band portions of the first and second external electrodes 131 and 132 or not in the first and second band portions but only in the first and second connection portions. Since the ion migration of the conductive metal 1322a included in the first and second external electrodes 131 and 132 mainly occurs on the first surface, the second surface, the fifth surface, and the sixth surface where the first and second band portions are disposed, when the metal layer 1324 is not disposed in first and second band portions but only in the first and second connection portions, the ion migration may be further prevented or delayed.

The metal layer 1324 of the first and second external electrodes 131 and 132 may be analyzed by examining the cross-section of the multilayered capacitor 100 cut at a ½ point of the width direction (W-axis direction) in the longitudinal direction (L-axis direction) and the thickness direction (T-axis direction) perpendicular to the width direction with a scanning electron microscope (SEM), a scanning transmission electron microscope (STEM), or the like. Other methods and/or tools appreciated by one of ordinary skill in the art, even if not described in the present disclosure, may also be used.

For example, a composition of the resin 1322b and the conductive metal 1322a of the conductive resin layers 1312 and 1322 and the noble metal of the metal layer 1324 (e.g., the weight of the noble metal to the conductive metal in a unit area of 25 μm×4 μm) may be measured through a component analysis by using an electron beam micro analyzer (EPMA) during the examination of the cross-section. When the component analysis is performed with an electron beam microanalyzer (EPMA), an energy dispersive spectroscope (EDS), or a wavelength dispersive spectroscope (WDS), as an X-ray spectrometer may be used. Other methods and/or tools appreciated by one of ordinary skill in the art, even if not described in the present disclosure, may also be used.

In addition, an area ratio of the resin 1322b and the conductive metal 1322a of the conductive resin layers 1312 and 1322 and the noble metal of the metal layer 1324 is measured by image analysis of a cross-sectional photograph obtained by cross-sectional observation such as SEM or STEM. When the cross-sections of the first and second external electrodes 131 and 132 are examined through reflection electron images of SEM, HAADF images of STEM, or the like, the conductive metal 1322a having a metallic bond and a noble metal may be recognized as a bright portion, and a non-metallic component such as the resin 1322b (including other pores and oxides) may be recognized as a dark portion of the contrast. Accordingly, the area ratio of the resin 1322b and the conductive metal 1322a of the conductive resin layers 1312 and 1322 and the noble metal of the metal layer 1324 may be calculated as an area ratio of the bright portion to the entire measured visual field by binarizing the cross-section photographs and the like. Other methods and/or tools appreciated by one of ordinary skill in the art, even if not described in the present disclosure, may also be used. In addition, the measurement may be performed in at least 5 visual fields or more and then averaged.

When the metal layer 1324 is present in the first and second connection portions, in the cross-section of the multilayered capacitor 100 cut at the center (½) point of the width direction (W-axis direction) in the longitudinal direction (L-axis direction) and the thickness direction (T-axis direction) perpendicular to the width direction (W-axis direction), a weight ratio of the noble metal and the conductive metal 1322a per unit area (25 μm×4 μm) may be about 0.05:1 to about 0.4:1, for example, about 0.08:1 to about 0.37:1, or about 0.1:1 to about 0.35:1.

Herein, when the metal layer 1324 is disposed in the first and second connection portions, the unit area (25 μm×4 μm) has a thickness direction (T-axis direction) length of about 25 μm and a longitudinal direction (L-axis direction) length of about 4 μm, the ½ point of the thickness direction (T-axis direction) length (about 25 μm) of the unit area (25 μm×4 μm) is located at a point where the first and second external electrodes 131 and 132 including the sintered metal layers 1311 and 1321, the conductive resin layers 1312, and 1322, and the plating layers 1313 and 1323 have the thickest thickness (i.e., L-axis direction length), and the center ½ point of the longitudinal direction (L-axis direction) length (about 4 μm) from both ends in the thickness direction (T-axis direction) may be located at the boundary between the conductive resin layers 1312 and 1322 and the metal layer 1324.

On the other hand, when the metal layer 1324 is disposed in the first and second band portions, the unit area (about 25 μm×about 4 μm) has a longitudinal direction (L-axis direction) length of about 25 μm and a thickness direction (T-axis direction) length of about 4 μm, the central (½) point of the longitudinal direction (L-axis direction) length (about 25 μm) of the unit area (about 25 μm×about 4 μm) may be located at a point where the first and second external electrodes 131 and 132 all including the sintered metal layers 1311 and 1321, the conductive resin layers 1312 and 1322, and the plating layer 1313, and 1323 have the thickest thickness (i.e., T-axis direction length), and the central (½) point of the thickness direction (T-axis direction) length (4 μm) from both ends of the longitudinal direction (L-axis direction) may be located at the boundary of the conductive resin layers 1312 and 1322 and the metal layer 1324.

When the conductive metal 1322a includes the noble metal in a weight ratio of less than about 0.05, the metal layer 1324 becomes thinner, thereby increasing sheet resistance, but when the weight ratio is greater than about 0.4, the ion migration may be weak due to the content increase of the noble metal.

When the metal layer 1324 is disposed in the first and second connection portions, in a cross-section of the multilayered capacitor 100 cut at the center (½) point of the width direction (W-axis direction) in the longitudinal direction (L-axis direction) and the thickness direction (T-axis direction) perpendicular to the width direction (W-axis direction), a longitudinal direction (L-axis direction) average length of the metal layer 1324, that is, an average thickness of the metal layer 1324 may be less than or equal to about 5 μm, for example about 0.7 μm to about 4.5 μm.

Herein, in the first and second connection portions, the average thickness of the metal layer 1324 may be obtained by taking about 10 points at a predetermined interval in the thickness direction (T-axis direction) from a reference point, which is the center (½) point of the thickness direction (T-axis direction) length (about 25 μm) of the unit area and then, calculating an arithmetic mean thereof. Herein, the 10 points must be located within the unit area, and the interval among the 10 points may be the same or different, for example, about 1 μm to about 2 μm.

On the other hand, when the metal layer 1324 is located in the first and second band portions, the thickness direction (T-axis direction) average length of the metal layer 1324, that is, the average thickness of the metal layer 1324 may be less than or equal to about 5 μm, for example about 0.7 μm to about 4.5 μm.

Herein, in the first and second band portions, the average thickness of the metal layer 1324 may be obtained by taking 10 points with a predetermined interval in the longitudinal direction (L-axis direction) from a reference point, which is the central (½) point of the longitudinal direction (L-axis direction) length (about 25 μm) of the unit area, and then, calculating an arithmetic mean thereof. The 10 points must be located within the unit area, and the interval among the 10 points may be the same or different, for example, about 1 μm to about 2 μm.

When the metal layer 1324 has an average thickness of greater than about 5 μm, with consideration of the entire size of the multilayered capacitor 100, the metal layer 1324 may be too thick, and the ion migration may occur due to as the increased content of the noble metal.

The metal layer 1324 may exist in a generally similar shape and thickness at the band portion, the connection portion, and the edge therebetween of the multilayered capacitor 100. However, the average thickness of the metal layer 1324 may be thicker in the band portion than in the connection portion.

The metal layer 1324 may be an aggregate layer of noble metal nanoparticles 1324a.

Herein, the noble metal nanoparticles 1324a may be nanoparticles of the above noble metal, for example, silver (Ag), platinum (Pt), or gold (Au), and the aggregate layer may be a layer formed by aggregating a plurality of the noble metal nanoparticles 1324a, for example, by stacking layers in which the noble metal nanoparticles 1324a are continuously or discontinuously arranged.

Accordingly, in a cross-section cut in the longitudinal direction (L-axis direction) and thickness direction (T-axis direction) perpendicular to the width direction (W-axis direction) at the center (½) point in the width direction (W-axis direction) of the multilayered capacitor 100, the metal layer 1324 may include a break portion, an island portion, a pore portion, or a combination thereof. Herein, the pore portion may be a space between the noble metal nanoparticles 1324a arranged with an interval, the break portion may be a portion where the noble metal nanoparticles 1324a are not disposed in the entire thickness direction of the metal layer 1324, and the island portion may be a group of the noble metal nanoparticles 1324a between the pore portions, between the break portions, or between the pore portion and the break portion.

The noble metal nanoparticles 1324a may have an average particle size of about 0.2 μm to about 2.5 μm, for example, about 0.5 μm to about 2.2 μm, or about 0.7 μm to about 2.0 μm. The particle size of the noble metal nanoparticles 1324a may be measured, in the scanning electron microscope (SEM) or scanning transmission electron microscope (STEM) image of the cross-section of the multilayered capacitor 100 cut in the central (½) point of the width direction (W-axis direction) in the longitudinal direction (L-axis direction) and thickness direction (T-axis direction) perpendicular to the width direction (W-axis direction), by measuring the longest short axis among the short axes perpendicular to a long axis of the noble metal nanoparticles 1324a, and an average particle size of the noble metal nanoparticles 1324a may be obtained as an arithmetic mean of the particle sizes of 10, 20, or 50 of the noble metal nanoparticles 1324a. Other methods and/or tools appreciated by one of ordinary skill in the art, even if not described in the present disclosure, may also be used.

When the noble metal nanoparticles 1324a have an average particle size of less than about 0.2 μm, the noble metal nanoparticles 1324a may fall off from the surface of the metal layer 1324 during the plating process, and when the average particle size is greater than about 2.5 μm, the plating layers 1313 and 1323 may ununiformly grow due to a concavo-convex structure of the noble metal nanoparticles 1324a.

In addition, a portion of the noble metal nanoparticles 1324a at the interface with the conductive resin layers 1312 and 1322 replace the conductive metal 1322a of the conductive resin layers 1312 and 1322, thereby penetrating into the conductive resin layers 1312 and 1322. For example, when the metal layer 1324 is formed by a galvanic exchange method, the noble metal nanoparticles 1324a partially replace the conductive metal 1322a of the conductive resin layers 1312 and 1322 to form a seed layer, and then the noble metal nanoparticles 1324a are stacked on the noble metal nanoparticles 1324a to from the metal layer 1324.

The first and second external electrodes 131 and 132 may further include plating layers 1313 and 1323 outside the conductive resin layers 1312 and 1322.

The plating layers 1313 and 1323 may include nickel (Ni), copper (Cu), tin (Sn), palladium (Pd), platinum (Pt), gold (Au), silver (Ag), tungsten (W), titanium (Ti), or lead (Pb) alone or an alloy thereof. For example, the plating layers 1313 and 1323 may be a nickel (Ni) plating layer or a tin (Sn) plating layer, and may have a form in which a nickel (Ni) plating layer and a tin (Sn) plating layer are sequentially stacked or a tin (Sn) plating layer, a nickel (Ni) plating layer, and a tin (Sn) plating layer are sequentially stacked. In addition, the plating layers 1313 and 1323 may include a plurality of nickel (Ni) plating layers and/or a plurality of tin (Sn) plating layers.

The plating layers 1313 and 1323 may improve mountability of the multilayered capacitor 100 with a board, structural reliability, external durability, heat resistance, and equivalent series resistance (ESR).

A method of manufacturing a multilayered capacitor according to another embodiment includes forming a conductive paste layer on a surface of dielectric green sheets, stacking the dielectric green sheets to manufacture a dielectric green sheet stack, firing the dielectric green sheet stack to form a capacitor body, and forming an external electrode outside the capacitor body.

First, the manufacturing of the capacitor body is described. In the manufacturing process of the capacitor body, a dielectric paste to become the dielectric layer after firing and a conductive paste to become the internal electrode after firing are prepared.

The dielectric paste is prepared, for example, by the following method. Ceramic materials are uniformly mixed by means such as wet mixing, dried, and heat-treated under predetermined conditions to obtain calcined powder. To the obtained calcined powder, an organic vehicle or an aqueous vehicle is added and kneaded to prepare a dielectric paste.

A dielectric green sheet is obtained by forming the obtained dielectric paste into a sheet by a doctor blade method or the like. In addition, the dielectric paste may include an additive selected from various dispersants, plasticizers, dielectrics, subcomponent compounds, or glass as needed.

Conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is applied in a predetermined pattern by various printing methods such as screen printing or a transfer method. After stacking a plurality of layers of dielectric green sheets on which internal electrode patterns are formed, a dielectric green sheet stack is obtained by pressing in the stacking direction. At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then, the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack is treated to remove the binder and fired, obtaining the capacitor body.

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining about 180° C. to about 400° C. for about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1200° C. to about 1350° C. or about 1220° C. to about 1300° C. for about 0.5 hours to about 8 hours or about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be about $1.0 \times 10^{-14}$ MPa to about $1.0 \times 10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for more than 0 hour to about 20 hours by increasing the temperature at about 50° C./hour to about 500° C./hour. The annealing may be performed under a humid nitrogen gas (N2) atmosphere, wherein an oxygen partial pressure may be about $1.0 \times 10^{-9}$ MPa to about $1.0 \times 10^{-5}$ MPa.

In the binder removal treatment, the firing treatment, or the annealing treatment, in order to humidify nitrogen gas, mixed gas, or the like, a wetter or the like may be for example, used, wherein a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrode on the outer surfaces of the third and fourth surfaces, thereby improving the electrical connection of the first and second external electrodes and the first and second internal electrodes and easily forming the alloy portion.

Optionally, a paste for a sintered metal layer may be coated onto the outer surface of the obtained capacitor body and then sintered to form a sintered metal layer.

The paste for the sintered metal layer includes a conductive metal and glass. The conductive metal and glass are the same as above and will not be repeatedly illustrated. In addition, the paste for the sintered metal layer may optionally include a subcomponent such as a binder, a solvent, a dispersant, a plasticizer, or oxide powder. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

A method of coating the paste for the sintered metal layer on the outer surface of the capacitor body may include various printing methods such as a dip method, or screen printing, and the like, a coating method by using a dispenser, a spray method by using a spray, and the like. The paste for the sintered metal layer may be coated on at least the third and fourth surfaces of the capacitor body and optionally, on a portion of the first surface, second surface, the fifth surface, or the sixth surface where the band portions of the first and second external electrodes are formed.

Thereafter, the capacitor body on which the paste for the sintered metal layer is coated is dried and sintered at a temperature of about 700° C. to about 1000° C. for about 0.1 hour to about 3 hours to form a sintered metal layer.

A conductive resin layer paste may be coated on the outer surface of the obtained capacitor body and then cured to form a conductive resin layer.

The paste for the conductive resin layer may include a conductive metal and a resin. The conductive metal and the resin are the same as described above and will not be repeated illustrated again. In addition, the paste for the conductive resin layer may optionally include a subcomponent such as a binder, a solvent, a dispersant, a plasticizer, or an oxide powder. For example, the binder may include ethyl cellulose, acryl, butyral, or the like, and the solvent may include an organic solvent such as terpineol, butyl carbitol, alcohol, methylethylketone, acetone, or toluene, or an aqueous solvent.

For example, a method of forming the conductive resin layer may include dipping the capacitor body 110 into the paste for the conductive resin layer including a resin and a conductive metal and curing it, screen-printing or gravure-printing the paste for the conductive resin layer on the surface of the capacitor body 110, or coating paste for the conductive resin layer on the surface of the capacitor body 110 and then curing it.

Next, a metal layer including a noble metal is formed outside the conductive resin layer.

For example, the forming of the metal layer may be performed using a galvanic exchange method, an electrolytic plating method, a curable resin paste coating method, a sintering-type ink coating method, an electroless plating method including a reducing agent, an MOD (metal organic decomposition) ink coating method, or a vapor deposition method. When the metal layer is formed by the galvanic exchange method, the noble metal nanoparticles partially replace the conductive metal of the conductive resin layer to form a seed layer, and then the noble metal nanoparticles are stacked on the noble metal nanoparticles to form the metal layer.

Optionally, a plating layer is formed outside the conductive resin layer and/or the metal layer.

For example, the plating layer may be formed by a plating method, or may be formed by sputtering or electroplating (electric deposition).

Hereinafter, specific embodiments of the disclosure are presented. However, the examples described below are only for specifically illustrating or explaining the disclosure, and the scope of the disclosure is not limited thereto.

PREPARATION EXAMPLES:
MANUFACTURING OF MULTILAYERED
CAPACITOR

Example 1

A paste including barium titanite ($BaTiO_3$) powder is coated on a carrier film and then dried, manufacturing a plurality of dielectric green sheets.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Subsequently, a paste for a sintered metal layer including glass and copper (Cu) as a conductive metal is coated on the outer surface of the capacitor body by a dip method, dried, and then sintered to form a sintered metal layer Then, a paste for a conductive resin layer including an epoxy resin and copper (Cu) as a conductive metal is coated on the outer surface of the capacitor body by a dip method, dried, and cured to form a conductive resin layer.

The capacitor body having the conductive resin layer is moved to an aqueous solution (10 mM to 1 M) of Ag(NO₃), maintained for 10 minutes to 30 minutes to cause a silver (Ag) reduction reaction, and 2 to 3 times washed with distilled water to remove excessive silver (Ag) reducing product off the surface.

After silver (Ag) coating, nickel (Ni) and tin (Sn) plating is performed to manufacture a multilayered capacitor.

Comparative Example 1

A multilayered capacitor is manufactured in the same manner as in Example 1 except that the silver (Ag) coating is not performed after forming the conductive resin layer in Example 1.

Experimental Example 1: Formation Analysis of Metal Layer

In the multilayered capacitor of Example 1, a thickness of each region of the metal layer is measured.

The L-axis direction and T-axis direction surface (e.g., fifth or sixth surface) of manufactured multilayered capacitor is polished to about ½ of a depth along the W-axis direction, and on the exposed cut surface, a connection portion of a dielectric layer and an internal electrode with an external electrode is ion-milled, preparing a sample. In the prepared sample, the thickness of the metal layer is measured at ten points within a unit area (25 μm×4 μm) per each region of a band portion of the first surface, an edge (corner) between the band portion of the first surface and the connection portion, a center in the thickness direction (W-axis direction) of the connection portion, an edge (corner) between the band portion of the second surface and the connection portion, and the second band portion to obtain a maximum value, a minimum value, and an average thereof, and the results are shown in Table 1.

Figure 5:
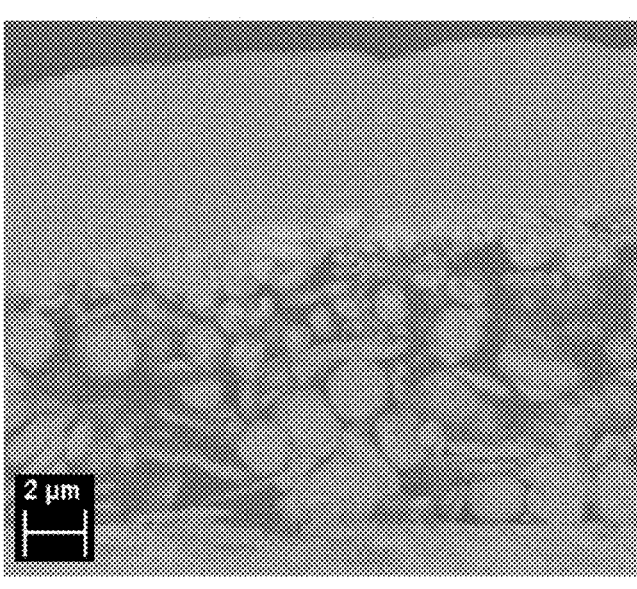
FIG. 5 is a photograph of a boundary between an external electrode and) a capacitor body of the multilayered capacitor manufactured in Example 1 observed with a scanning electron microscope (SEM).
Figure 6:
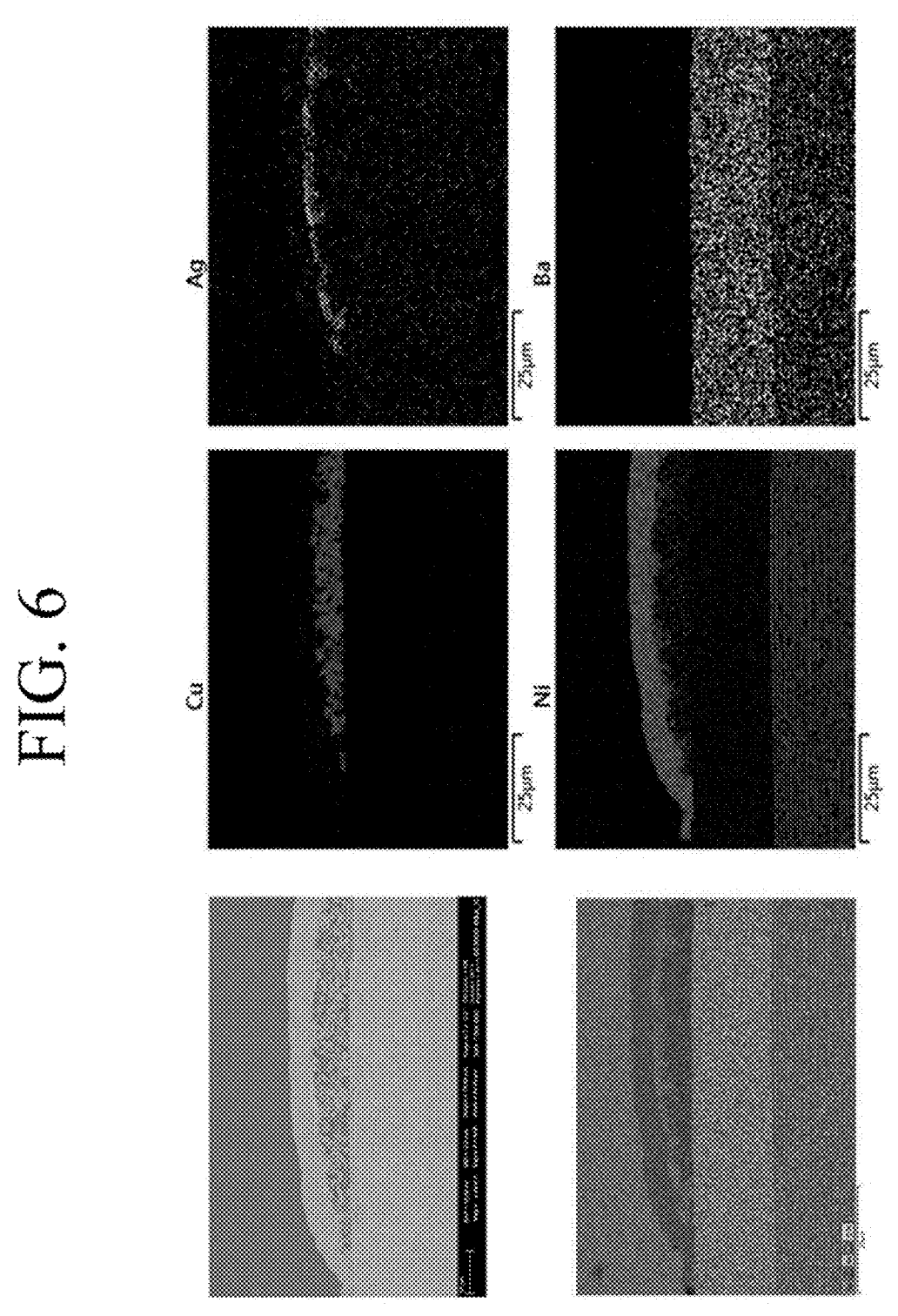

In addition, after examining a boundary between the external electrode and the capacitor body of the prepared sample with SEM, EDS is used to perform a component analysis, and the results are respectively shown in FIGS. 5 and 6.

TABLE 1

| Thickness of metal layer | Band portion of first surface | Corner between the band portion and the connection portion of the first surface | Center of connection portion in thickness direction | Corner between the band portion and the connection portion of the first surface | Band portion of second surface |
|---|---|---|---|---|---|
| Average (μm) | 1.78 | 1.8 | 1.65 | 1.87 | 1.82 |
| Maximum (μm) | 3.85 | 4.31 | 3.15 | 2.95 | 3.58 |
| Minimum (μm) | 0.81 | 0.86 | 0.75 | 1.09 | 0.93 |

Comparative Example 2

A paste including barium titanite (BaTiO₃) powder is coated on a carrier film and then dried, manufacturing a plurality of dielectric green sheets.

A conductive paste including nickel (Ni) is screen-printed on each dielectric green sheet to form a conductive paste layer.

A dielectric green sheet stack is manufactured by stacking the plurality of dielectric green sheets, while at least each portion of the conductive paste layers thereon is overlapped.

The dielectric green sheet stack is cut into individual chips, which are maintained under an air atmosphere at 230° C. for 60 hours to remove a binder and then fired at 1200° C., manufacturing a capacitor body.

Subsequently, a paste for a sintered metal layer including glass and copper (Cu) as a conductive metal is coated on the outer surface of the capacitor body by a dip method, dried, and then sintered to form a sintered metal layer.

Then, a paste for a conductive resin layer including an epoxy resin and copper (Cu) powder coated with silver (Ag) as a conductive metal is coated on the outer surface of the capacitor body by a dip method, dried, and cured to form a conductive resin layer.

The capacitor body having the conductive resin layer is plated with nickel (Ni) and tin (Sn), manufacturing a multilayered capacitor.

Referring to Table 1 and FIGS. 5 and 6, the metal layer turns out to be generally present in a similar shape and thickness in the band portion, edge, and connection portion of the multilayered capacitor. The metal layer has a thickness of 0.7 μm to 4.5 μm along the copper (Cu) particles exposed on the surface of the conductive metal layer but broken by friction between the multilayered capacitors during the formation of the metal layer, or silver (Ag) particles off the surface are observed to be present inside the plating layer.

On the other hand, regarding a weight ratio of the noble metal (Ag) of the metal layer and the conductive metal (Cu) of the conductive resin layer, four measurements in the connection portion and five measurements in the band portion are obtained, and the results are shown in Table 2.

Herein, the metal layer is coated to have a predetermined thickness only on the surface of the conductive resin layer, but since the conductive resin layer has a different thickness depending on a size and an electrical characteristic of the multilayered capacitor, as shown in FIG. 2, the unit area is limited to a rectangle with a width of 4 μm, each 2 μm inside and outside, based on the conductive resin layer surface. The unit area is set to have a length of 25 μm, and an SEM image is acquired at 10 keV and ×5000 magnification.

In Table 2, Samples 1 to 4 are cases that a center (½) point of the thickness direction (T-axis direction) length (25 μm) of the unit area (25 μm×4 μm) in the connection portion is a point where the thickness (i.e., L-axis direction length) of the external electrode is thickest, and Samples 5 to 9 are cases that a center (½) point of the longitudinal direction (L-axis direction) length (25 μm) of the unit area (25 μm×4 μm) in the band portion is a point where the thickness (i.e., T-axis direction length) of the external electrode is thickest. Herein, the point where the thickness (i.e., L-axis direction length) of the external electrode is thickest is a point where the external electrode is thickest in a region all including the sintered metal layer, the conductive resin layer, and the plating layer.

Figure 7:
FIG. 7 is a scanning electron microscope (SEM) photograph of a connection portion in which unit area is indicated.
Figure 8:
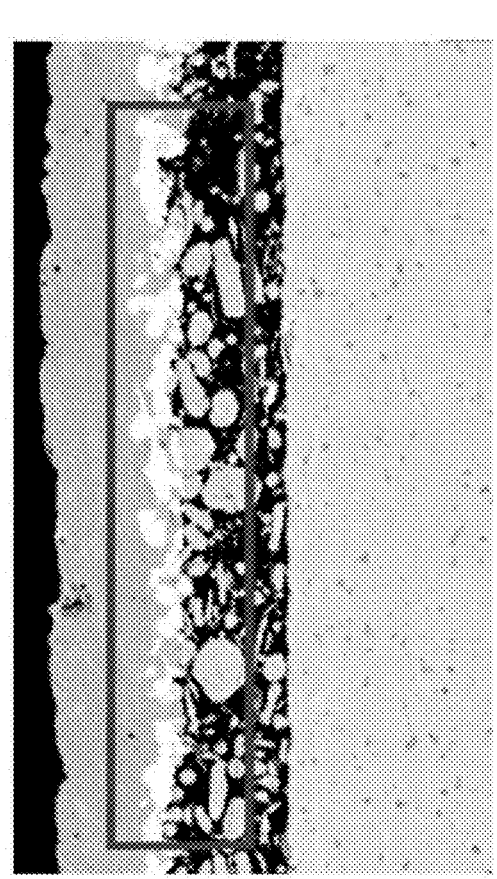
FIG. 8 is a scanning electron microscope (SEM) photograph of a band portion in which unit area is indicated.

Samples 1 and 5 are taken of a scanning electron microscope (SEM) photograph where the unit area is marked to measure the weight ratio of the noble metal (Ag) of the metal layer and the conductive metal (Cu) of the conductive resin layer, which are respectively shown in FIGS. 7 and 8.

TABLE 2

| Connection portion | Sample 1 | Sample 2 | Sample 3 | Sample 4 | — |
|---|---|---|---|---|---|
| Ag/Cu weight ratio (SEM-EDS) | 0.16 | 0.13 | 0.12 | 0.10 | — |

| Band portion | Sample 5 | Sample 6 | Sample 7 | Sample 8 | Sample 9 |
|---|---|---|---|---|---|
| Ag/Cu weight ratio (SEM-EDS) | 0.27 | 0.21 | 0.19 | 0.16 | 0.14 |

Referring to Table 2 and FIGS. 7 to 8, as a result of randomly analyzing the samples in the same process, the Ag/Cu weight ratio is observed to be high in the portions where the metal layer is thick and much connected, and the band portion tends to have a little higher Ag/Cu weight ratio than the connection portion, which is similar to the above thickness measurement results, but both of the portions overall exhibit a thickness and an Ag/Cu weight ratio at a similar level.

Experimental Example 2: Performance Analysis of Multilayered Capacitor

The multilayered capacitors of Example 1 and Comparative Examples 1 and 2 are measured with respect to ESR, break defects of a plating layer, and generation of ion migration, and the results are shown in Table 3.

As for ESR, 200 of each of the multilayered capacitors of Example 1 and Comparative Examples 1 and 2 are prepared and mounted respectively on a board to compare initial ESR and ESR after 100 temperature cycles.

Figure 9:
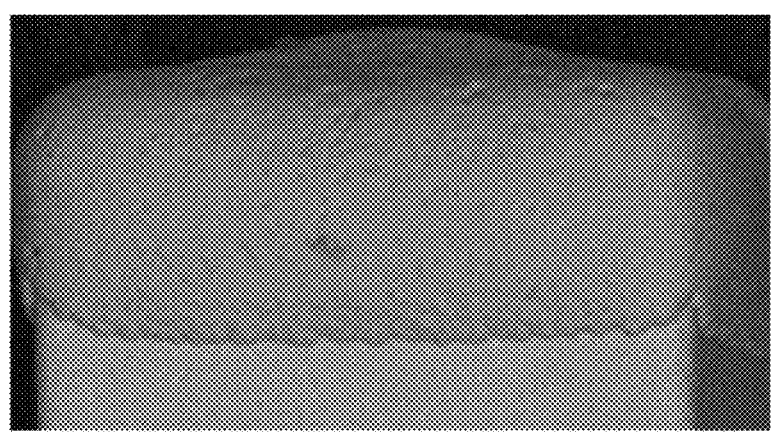
FIG. 9 is a photograph showing the plating layer of the multilayered capacitor manufactured in Example 1.
Figure 10:
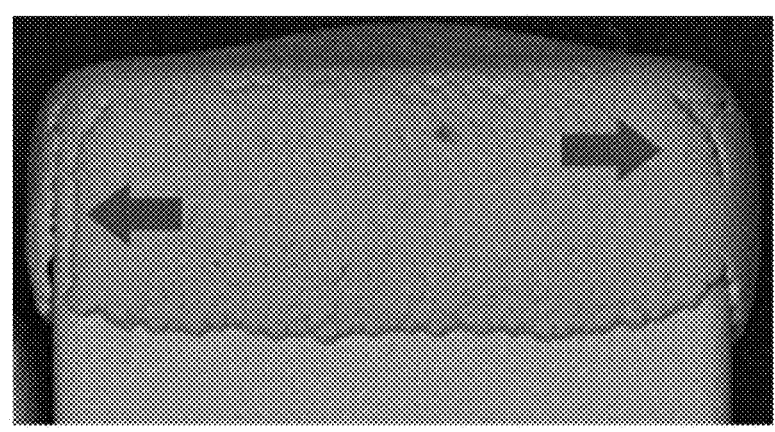
FIG. 10 is a photograph showing the plating layer of the multilayered capacitor manufactured in Comparative Example 1.

The break defects of a plating layer are evaluated by examining the L-axis direction and W-axis direction surface (e.g., first surface) of the multilayered capacitors of Example 1 and Comparative Examples 1 and 2 to compare frequencies of chips in which a conductive resin layer is exposed. FIG. 9 is a photograph showing the plating layers of the multilayered capacitor manufactured in Example 1, and FIG. 10 is a photograph showing the plating layer of the multilayered capacitor manufactured in Comparative Example 1.

The ion migration is measured by using the multilayered capacitors (size: 1.6 mm×0.8 mm×0.8 mm) of Example 1 and Comparative Examples 1 and 2 and performing a water drop test of dropping 10 ul of distilled water on the surface (e.g., first surface) between the first and second external electrodes and applying 20 V of DC power to the first and second external electrodes. After a predetermined period of time, in the multilayered capacitors, a dendrite growing from a (−) electrode to a (+) electrode is found, and when both of the electrodes are connected by the dendrite, a current of 1 mA or more flows. Time of this moment is measured to define a level of the ion migration.

TABLE 3

| | ESR | | Inferior plating Ni plating | Ion migration (20 V) Current leak |
|---|---|---|---|---|
| | Initial value (mΩ) | TC100 (mΩ) | fine breakage (pieces) | (−1 mA) occurrence time (sec) |
| Comparative Example 1 | 13.5 | 15.2 | 35/200 | 300< |
| Example 1 | 11.8 | 13.1 | 0/200 | 200-300 |

TABLE 3-continued

| | ESR | | Inferior plating Ni plating | Ion migration (20 V) Current leak |
|---|---|---|---|---|
| | Initial value (mΩ) | TC100 (mΩ) | fine breakage (pieces) | (−1 mA) occurrence time (sec) |
| Comparative Example 2 | 10.2 | 12.4 | 0/200 | 150-180 |

Referring to Table 3, the multilayered capacitor of Example 1 exhibits low initial ESR, a low change rate after the temperature cycles, and no micro-breaks in the plating layer and delays the ion migration, compared with the multilayered capacitors of Comparative Examples 1 and 2.

In addition, referring to FIGS. 9 and 10, the conductive resin layer including copper (Cu), unlike the conductive resin layer including silver (Ag), has very high sheet resistance and exhibits a relatively slow initial nickel (Ni) plating rate and thus plating break defects due to falling-off of a resin of the base portion before connected by formation of an appropriate-level nickel (Ni) plating layer.

In particular, since the smaller the multilayered capacitor, the thinner the conductive resin layer applied thereto, the falling-off of the conductive resin layer at the edge of the multilayered capacitor due to collision between the multilayered capacitors or between the multilayered capacitor and a plating sub-material during the plating. When the conductive resin layer is thicker, the break level may be improved, but the frequencies keep similar. On the contrary, the multilayered capacitor of Example 1, even though the conductive resin layer includes copper (Cu), exhibits improvement of the plating breaks. Although not bound by a particular theory, this improvement result is understood to be caused by the metal layer, which lowers sheet resistance of the conductive resin layer, so that nickel (Ni) is rapidly plated to protect the conductive resin layer.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A multilayered capacitor, comprising
a capacitor body including a dielectric layer and an internal electrode, and
an external electrode outside the capacitor body and on the capacitor body,
wherein the external electrode includes:
    a conductive resin layer disposed outside the capacitor body and on the capacitor body, the conductive resin layer including a resin and a conductive metal, and
    a metal layer disposed on a surface of the conductive resin layer and including a noble metal, and
    in a cross-section of the multilayered capacitor in a longitudinal direction and a thickness direction at a center point in a width direction, a weight ratio of the noble metal to the conductive metal in a unit area of 25 μm×4 μm is about 0.05:1 to about 0.4:1.

2. The multilayered capacitor of claim 1, wherein the noble metal includes silver (Ag), platinum (Pt), gold (Au), or a combination thereof.

3. The multilayered capacitor of claim 1, wherein the capacitor body has:
    first and second surfaces facing each other in the thickness direction,
    third and fourth surfaces facing each other in the longitudinal direction, and
    fifth and sixth surfaces facing each other in the width direction.

4. The multilayered capacitor of claim 3, wherein in a cross-section of the multilayered capacitor in the longitudinal and thickness directions perpendicular to the width direction at a center point in the width direction,
an average length of the metal layer in the longitudinal direction on the third or fourth surface is less than or equal to about 5 μm.

5. The multilayered capacitor of claim 3, wherein in a cross-section of the multilayered capacitor in the longitudinal and thickness directions perpendicular to the width direction at a center point in the width direction,
an average length of the metal layer in the thickness direction on the first or second surface is less than or equal to about 5 μm.

6. The multilayered capacitor of claim 3, wherein the external electrode has a connection portion configured to cover the third or fourth surface of the capacitor body and a band portion configured to cover a corner of the third or fourth surface, and
the metal layer is disposed in the connecting portion, the band portion, or both.

7. The multilayered capacitor of claim 6, wherein an average thickness of the metal layer in the band portion is greater than an average thickness of the metal layer in the connection portion.

8. The multilayered capacitor of claim 1, wherein the metal layer includes aggregated noble metal nanoparticles.

9. The multilayered capacitor of claim 8, wherein an average particle size of the noble metal nanoparticles is about 0.2 μm to about 2.5 μm.

10. The multilayered capacitor of claim 8, wherein in a cross-section of the multilayered capacitor in longitudinal and thickness directions perpendicular to the width direction at a center point in the width direction, the metal layer includes (i) a break portion, (ii) an island portion, (iii) a pore portion, or any combination of (i) to (iii).

11. The multilayered capacitor of claim 8, wherein at least a portion of noble metal nanoparticles, among the aggregated noble metal nanoparticles, at an interface with the conductive resin layer penetrates into the conductive resin layer.

12. The multilayered capacitor of claim 1, wherein the resin includes an epoxy-based resin, and the conductive metal includes copper (Cu), silver (Ag), nickel (Ni), or a mixture thereof.

13. The multilayered capacitor of claim 1, wherein the external electrode further includes a plating layer outside the conductive resin layer and on the conductive resin layer.

14. The multilayered capacitor of claim 1, wherein the external electrode further includes a sintered metal layer between the capacitor body and the conductive resin layer.

15. A method of manufacturing the multilayered capacitor of claim 1, comprising
manufacturing the capacitor body including the dielectric layer and the internal electrode, and
forming the external electrode outside the capacitor body and on the capacitor body,
wherein the forming of the external electrode includes:
    forming the conductive resin layer including the resin and the conductive metal outside the capacitor body and on the capacitor body, and
    forming the metal layer including the noble metal outside the conductive resin layer and on the conductive resin layer.

16. The method of claim 15, wherein the forming of the metal layer includes performing a galvanic exchange method, an electrolytic plating method, a curable resin paste coating method, a sintering-type ink coating method, an electroless plating method including a reducing agent, an metal organic decomposition (MOD) ink coating method, or a vapor deposition method.

17. The method of claim 15, wherein the forming of the conductive resin layer includes coating a paste for the conductive resin layer including the resin, a conductive metal powder, and an organic solvent.

18. The method of claim 15, wherein the forming of the external electrode further includes, before the forming of the conductive resin layer, coating a paste for a sintered metal layer including the conductive metal and glass outside the capacitor body and on the capacitor body, and then sintering the paste to form a sintered metal layer.

19. The method of claim 15, wherein the forming of the external electrode further includes, after the forming of the metal layer, forming a plating layer on the metal layer by performing a plating method.

20. A multilayered capacitor, comprising
a capacitor body including a dielectric layer and an internal electrode, and
an external electrode outside the capacitor body and on the capacitor body,

23

24 wherein the external electrode includes:

a conductive resin layer disposed outside the capacitor body and on the capacitor body, the conductive resin layer including a resin and a conductive metal, and a metal layer disposed on a surface of the conductive resin layer and including a noble metal, wherein the metal layer is free of resin, and in a cross-section of the multilayered capacitor in a longitudinal direction and a thickness direction at a center point in a width direction, a weight ratio of the noble metal to the conductive metal in a unit area of 25 μm×4 μm is about 0.05:1 to about 0.4:1.

21. The multilayered capacitor of claim 20, wherein the noble metal includes silver (Ag), platinum (Pt), gold (Au), or a combination thereof.

22. The multilayered capacitor of claim 20, wherein the capacitor body has:

first and second surfaces facing each other in the thickness direction, third and fourth surfaces facing each other in the longitudinal direction, and fifth and sixth surfaces facing each other in the width direction.

23. The multilayered capacitor of claim 22, wherein the noble metal includes silver (Ag).

24. The multilayered capacitor of claim 23, wherein the resin includes an epoxy-based resin, and the conductive metal includes copper (Cu), silver (Ag), nickel (Ni), or a mixture thereof.

25. The multilayered capacitor of claim 24, wherein the conductive metal includes copper (Cu).

26. A method of manufacturing the multilayered capacitor of claim 20, comprising manufacturing the capacitor body including the dielectric layer and the internal electrode, and forming the external electrode outside the capacitor body and on the capacitor body, wherein the forming of the external electrode includes:

forming the conductive resin layer including the resin and the conductive metal outside the capacitor body and on the capacitor body, and forming the metal layer including the noble metal outside the conductive resin layer and on the conductive resin layer by performing:

a galvanic exchange method, an electrolytic plating method, a sintering-type ink coating method, an electroless plating method including a reducing agent, a metal organic decomposition (MOD) ink coating method, or a vapor deposition method.

27. The method of claim 26, wherein the forming of the conductive resin layer includes coating a paste for the conductive resin layer including the resin, a conductive metal powder, and an organic solvent.

28. The method of claim 26, wherein the forming of the external electrode further includes, before the forming of the conductive resin layer, coating a paste for a sintered metal layer including the conductive metal and glass outside the capacitor body and on the capacitor body, and then sintering the paste to form a sintered metal layer.

29. The method of claim 26, wherein the forming of the external electrode further includes, after the forming of the metal layer, forming a plating layer on the metal layer by performing a plating method.

30. A multilayered capacitor, comprising a capacitor body including a dielectric layer and an internal electrode, and an external electrode outside the capacitor body and on the capacitor body, wherein the external electrode includes:

a conductive resin layer disposed outside the capacitor body and on the capacitor body, the conductive resin layer including a resin and a conductive metal, and a metal layer disposed on a surface of the conductive resin layer and including aggregated noble metal nanoparticles, and in a cross-section of the multilayered capacitor in a longitudinal direction and a thickness direction perpendicular to the width direction at a center point in the width direction, the metal layer includes (i) a break portion, (ii) an island portion, (iii) a pore portion, or any combination of (i) to (iii).

31. A multilayered capacitor, comprising a capacitor body including a dielectric layer and an internal electrode, and an external electrode outside the capacitor body and on the capacitor body, wherein the external electrode includes:

a conductive resin layer disposed outside the capacitor body and on the capacitor body, the conductive resin layer including a resin and a conductive metal, and a metal layer disposed on a surface of the conductive resin layer and including noble metal nanoparticles, the noble metal nanoparticles include aggregated noble metal nanoparticles, and at least a portion of noble metal nanoparticles, among the aggregated noble metal nanoparticles, at an interface with the conductive resin layer penetrates into the conductive resin layer.

* * * * *